(12) United States Patent
Sakaishi et al.

(10) Patent No.: US 11,707,859 B2
(45) Date of Patent: Jul. 25, 2023

(54) MACHINING APPARATUS AND TOOL LIFE ESTIMATION METHOD

(71) Applicant: Mitsubishi Electric Corporation, Tokyo (JP)

(72) Inventors: Takuya Sakaishi, Tokyo (JP); Taishi Ando, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/801,812

(22) PCT Filed: Apr. 27, 2020

(86) PCT No.: PCT/JP2020/017917
§ 371 (c)(1),
(2) Date: Aug. 24, 2022

(87) PCT Pub. No.: WO2021/220328
PCT Pub. Date: Nov. 4, 2021

(65) Prior Publication Data
US 2023/0087376 A1    Mar. 23, 2023

(51) Int. Cl.
*B26D 1/62* (2006.01)
*B23Q 17/09* (2006.01)
*B23Q 17/22* (2006.01)

(52) U.S. Cl.
CPC .............. *B26D 1/62* (2013.01); *B23Q 17/09* (2013.01); *B23Q 17/22* (2013.01)

(58) Field of Classification Search
CPC ........ B23Q 17/09; B23Q 17/22; B23Q 17/21; B26D 5/26; B26D 7/06; B26D 7/27; B26D 1/62; B23D 25/02

(Continued)

(56) References Cited

U.S. PATENT DOCUMENTS

2020/0316743 A1* 10/2020 Okamoto ............. B23Q 15/013
2022/0281129 A1*  9/2022 Sugiyama ............. B26D 5/007

FOREIGN PATENT DOCUMENTS

JP    7-195256 A    8/1995
JP    9-39318 A     2/1997
(Continued)

OTHER PUBLICATIONS

International Search Report and Written Opinion dated Jul. 14, 2020, received for PCT Application PCT/JP2020/017917, filed on Apr. 27, 2020, 9 pages including English Translation.

(Continued)

*Primary Examiner* — Ghassem Alie
(74) *Attorney, Agent, or Firm* — Xsensus LLP

(57) ABSTRACT

A machining apparatus includes encoders that detect first rotational positions of motors that respectively drive an unwind shaft and a take-up shaft for conveying a material, an encoder that detects a second rotational position of a motor that drives a cutter edge for cutting the material, and a controller that controls the motor based on the first rotational position and controls the motor based on the second rotational position to coordinately control conveyance of the material and movement of the cutter edge. The controller calculates positional relationship information representing a positional relationship between the material and the cutter edge based on the second rotational position, determines whether the cutter edge is in contact with the material based on the positional relationship information, and estimates a life of the cutter edge based on a load on the motor when the tool is in a contact state.

14 Claims, 3 Drawing Sheets

(58) Field of Classification Search
USPC .......................................................... 83/331
See application file for complete search history.

(56) References Cited

FOREIGN PATENT DOCUMENTS

| | | | |
|---|---|---|---|
| JP | 10-277420 A | 10/1998 | |
| JP | 2000-176890 A | 6/2000 | |
| JP | 2000-237993 A | 9/2000 | |
| JP | 2011-152595 A | 8/2011 | |
| JP | 2011-230222 A | 11/2011 | |
| JP | 2013-111657 A | 6/2013 | |
| JP | 2018081487 A * | 5/2018 | ........... G05B 19/402 |
| JP | 2018-167348 A | 11/2018 | |
| JP | 2019-30954 A | 2/2019 | |

OTHER PUBLICATIONS

Decision to Grant dated Dec. 15, 2020, received for JP Application 2020-558638, 5 pages including English Translation.

\* cited by examiner

MACHINING APPARATUS AND TOOL LIFE ESTIMATION METHOD

CROSS-REFERENCE TO RELATED APPLICATION

The present application is based on PCT filing PCT/JP2020/017917, filed Apr. 27, 2020, the entire contents of which are incorporated herein by reference.

FIELD

The present disclosure relates to a machining apparatus that estimates the life of a tool, and a life estimation method.

BACKGROUND

In a machine tool including a spindle motor for rotating a tool for machining materials, such as a machining center, a cutting machine, or a grinding machine, abrasion of the tool affects machining quality of materials. Thus, a machine tool requires adjustment of control of machining or maintenance of the tool depending on the abrasion condition of the tool before machining quality degrades.

The machine tool described in Patent Literature 1 utilizes the characteristic in that the load exerted on the tool or spindle increases with progress of tool abrasion, for estimating degree of abrasion of the tool. That is, the machine tool described in Patent Literature 1 considers the time period from a rapid increase to a rapid decrease in the load exerted on the tool or spindle as a time period during which the tool is in contact with the material, and thus estimates the abrasion degree of the tool based on an amount of change in the load during this time period.

CITATION LIST

Patent Literature

Patent Literature 1: Japanese Patent Application Laid-open No. 2019-30954

SUMMARY

Technical Problem

However, the technology of Patent Literature 1 listed above merely determines the contact state based on an amount of change in the load per unit time, and is therefore unable to determine an accurate contact state. This means that estimation of the abrasion degree of the tool is not based on an accurately-determined contact state; accordingly, there is a problem in that it is not capable of accurately estimating the life of a tool.

The present disclosure has been made in view of the foregoing, and it is an object of the present disclosure to provide a machining apparatus capable of accurately estimating the life of a tool.

Solution to Problem

To solve the problem and achieve the object described above, a machining apparatus of the present disclosure includes a first servomotor that drives a conveyor unit that conveys a material to be machined, a second servomotor that drives a tool for cutting the material, a first encoder that detects a first rotational position of the first servomotor, and a second encoder that detects a second rotational position of the second servomotor. The machining apparatus of the present disclosure also includes a controller that controls the first servomotor based on the first rotational position and control the second servomotor based on the second rotational position, to coordinately control conveyance of the material and movement of the tool. The controller calculates positional relationship information indicating a positional relationship between a machining position on the material and a position of the tool based on the second rotational position, determines whether the tool is in a contact state based on the positional relationship a information, and estimates a life of the tool based on a load on the second servomotor when the tool is in the contact state, where the contact state is a state in which the tool is in contact with the material.

Advantageous Effects of Invention

A machining apparatus according to the present disclosure provides an advantage in being capable of accurately estimating the life of a tool.

DESCRIPTION OF EMBODIMENTS

A machining apparatus and a life estimation method according to an embodiment of the present disclosure will be described in detail below with reference to the drawings.

Embodiment

Figure 1:
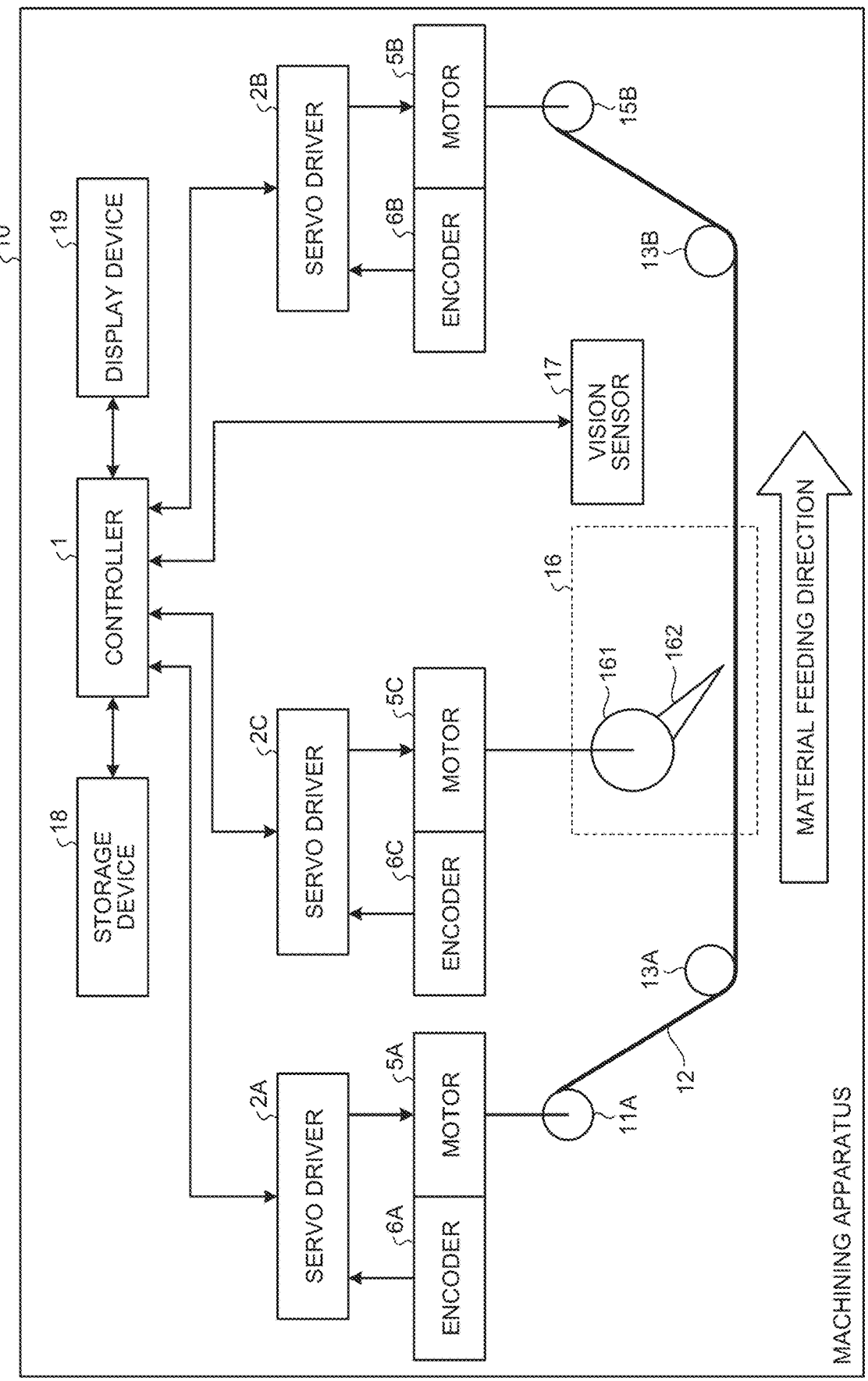
FIG. 1 is a diagram illustrating a configuration of a machining apparatus according to an embodiment.

FIG. 1 is a diagram illustrating a configuration of a machining apparatus according to an embodiment. A machining apparatus 10 is an apparatus for cutting a material 12 using a cutler edge 162, which is a tool. An example of the machining apparatus 10 is a converting apparatus that performs cutting of the material 12 that is a thin material in roll form, such as a roll of paper or a film. Note that the machining apparatus 10 is not limited to a converting apparatus. In addition, the material 12 is not limited to a thin material in roll form. The material 12 may also be, for example, a series of multiple pieces of material transported on a belt conveyor.

The machining apparatus 10 conveys the material 12 to be machined, and cuts the material 12 using the cutter edge 162 while managing positional relationship information indicating a positional relationship between the position of the material 12 and the position of the cutter edge 162. The position of the material 12 managed by the machining apparatus 10 is a target position at which the cutter edge 162 machines the material 12. The machining apparatus 10 controls synchronization between the position of the material 12 and the position of the cutter edge 162 using motors 5A to 5C, each of which is a servomotor. Conveyance by the machining apparatus 10 includes feeding of the material 12, positioning of the material 12 to the position at which the material 12 is to be cut, and discharging of the material 12. The cutting performed by the machining apparatus 10 includes slitting of a part of the material 12 into separate parts of the material 12, punching to cut out a part of the material 12 into a specific shape, perforation for ease of slitting of the material 12, and the like.

Note that the machining apparatus 10 needs to unwind and wind up the material 12 at positions in the vicinity of the cutting position, but if the converting apparatus completely cuts and separates the material 12 into pieces, it will prevent feeding of the material 12 (referred to hereinafter as material feeding) at a constant desired tension and winding up of the material 12 that has been cut. The embodiment will therefore be described for simplicity of illustration using an example in which the machining apparatus 10 performs perforation without slitting or separating the material 12.

The machining apparatus 10 includes a controller 1, servo drivers 2A to 2C, the motors 5A to 5C, encoders 6A to 6C, an unwind shaft 11A, a take-up shaft 15B, guide rollers 13A and 13B, a cutting mechanism 16, a vision sensor 17, a storage device 18, and a display device 19. The unwind shaft 11A and take-up shaft 15B are each, or in combination, a conveyor unit that conveys the material 12.

The cutting mechanism 16 includes a cutter shaft 161 and the cutter edge 162. The cutter edge 162 is an example of tool. The controller 1 is connected to the vision sensor 17, the storage device 18, the display device 19, and the servo drivers 2A to 2C.

The servo driver 2A is connected to the motor 5A and to the encoder 6A. The servo driver 2B is connected to the motor 5B and to the encoder 6B. The servo driver 20 is connected to the motor 5C and to the encoder 6C. The motor 5A is connected to the unwind shaft 11A. The motor 5B is connected to the take-up shaft 15B. The motor 5C is connected to the cutter shaft 161.

The controller 1 controls the entirety of the machining apparatus 10. That is, the controller 1 controls the vision sensor 17, the storage device 18, the display device 19, and the servo drivers 2A to 2C.

The storage device 13 is a memory or the like for storing information obtained or calculated by the controller 1. The storage device 18 is a non-volatile storage medium, which is capable of retaining information that is storage data even when the machining apparatus 10 is not in operation and after power-off of the machining apparatus 10. The display device 19 displays information obtained or calculated by the controller 1.

The servo driver 2A drives the motor 5A by a motor current. The servo driver 2B drives the motor 5B a motor current. The servo driver 2C drives the motor 5C by a motor current. The motor currents flowing to the motors 5A to 5C are drive currents for driving the motors 5A to 5C.

The motor 5A is a servomotor that rotates the unwind shaft 11A to unwind the material 12. The motor 5B is a servomotor that rotates the take-up shaft 15B to wind up the material 12. The motor 5C is a servomotor that rotates the cutter shaft 161 to move the cutter edge 162. The motors 5A and 5B together control the position of movement of the material 12 by a servo mechanism, and the motor 5C controls the position of movement of the cutter edge 162 by a servo mechanism. The motor 5A or the motor 5B is a first servomotor, and the motor 5C is a second servomotor.

The encoder 6A detects the rotational position of the motor 5A, and sends the result to the servo driver 2A. The encoder 6B detects the rotational position of the motor 5B, and sends the result to the servo driver 2B. The encoder 6C detects the rotational position of the motor 5C, and sends the result to the servo driver 2C. One example of the encoders 6A to 6C, each of which is a position detecting means, is a rotary encoder. The encoder 6A or the encoder 6B is a first encoder, and the encoder 6C is a second encoder. The rotational position of the motor 5A or the motor 5B is a first rotational position, and the rotational position of the motor 5C is a second rotational position.

The unwind shaft 11A is rotated by driving by the motor 5A to unwind the material 12. The guide rollers 13A and 13B serve to hold the material to correctly guide the material 12 to the machining position. The guide roller 13A feeds the material 12 unwound from the unwind shaft 11A to the machining position inside the cutting mechanism 16. The guide roller 135 feeds the material 12 fed from the guide roller 13A and passed through the cutting mechanism 16 to the take-up shaft 15B. Although FIG. 1 illustrates the guide rollers 13A and 13B together as a material hold mechanism having a simple configuration, the machining apparatus 10 may guide the material 12 to the machining position using a material hold mechanism having another configuration. The take-up shaft 15B is rotated by driving by the motor 55 to wind up the material 12.

The rotational positions of the motors 5A to 5C are used in calculation of the positional relationship information. In a case in which the material 12 is a material in roll form, the position of the material 12 relative to the cutter shaft 161 is constant. Accordingly, the controller 1 can calculate positional relationship information indicating the relative position of the cutter edge 162 with respect to the material 12, based on the rotational position of the motor 5C.

In addition, the rotational position of the motor 5A and the rotational position of the motor 55 are the same as each other. Accordingly, in a case in which the material 12 is a series of multiple pieces of material transported on a belt conveyor, the controller 1 can calculate the movement position of the material 12 in the cutting mechanism 16 based on the rotational position of either the motor 5A or the motor 5B. In this case, the controller 1 can calculate the positional relationship information based on the rotational postilion of the motor 5C and on the rotational position of either the motor 5A or the motor 5B.

The cutting mechanism 16 performs cutting of the material 12. The cutter shaft 161 of the cutting mechanism 16 is driven to rotate by the motor 5C, thereby rotating the cutter edge 162. The vision sensor 17, which is an imaging unit, images the portion undergoing cutting (hereinafter, cut portion) of the material 12 according to an instruction from the controller 1 to generate an image of the cut portion. The vision sensor 17 sends the image that is generated through image capturing to the controller 1. The vision sensor 17 is controlled by the controller 1 to be in synchronization with the servo drivers 2A to 2C.

The embodiment will be described with respect to a case in which the cutter edge 162 is a rotary cutter; however, the tool may be other than a rotary cutter. That is, any tool may be used as long as the machining apparatus uses a servomotor that controls synchronization between conveyance of the material 12 and cutting, machining performed by driving of the tool while managing positional relationship information.

The material 12 is unwound from the unwind shaft 11A, is fed to the cutting mechanism 16 through the guide roller 13A, passes through the guide roller 13B, and is wound up by the take-up shaft 15B. The cutter edge 162 comes into contact with the material 12, thereby cutting the material 12.

The controller 1 controls the motors 5A and 5B based on the rotational positions of the motors 5A and 5B, and controls the motor 5C based on the rotational position of the motor 5C to coordinately control the conveyance of the material 12 and the action of the cutter edge 162, which is a tool.

The controller 1 sends control commands to the servo drivers 2A to 2C in response to an operation made by an operator of the machine. In addition, the controller 1 acquires, from the encoders 6A to 6C, the rotational positions of the respective motors 5A to 5C detected by the respective encoders 6A to 6C. The controller 1 also acquires state information such as commanded current values sent from the servo drivers 2A to 2C to the motors 5A to 5C.

Moreover, the controller 1 calculates the positional relationship information indicating a positional relationship between the machining position, at which the cutter edge 162 acts on the material 12, and the position of the cutter edge 162 based on the rotational position of the motor 5C. The controller 1 calculates the distance from the machining position on the material 12 to the cutter edge 162 based on the rotational position of the motor 5C, and then calculates the positional relationship information based on this distance. Note that the controller 1 may calculate the positional relationship information directly from the rotational position of the motor 5C based on information indicating a relationship between the rotational position of the motor 5C and the distance from the machining position on the material 12 to the cutter edge 162. Furthermore, the controller 1 determines, based on the positional relationship information, whether the cutter edge 162 is in a contact state, which is a state in which the cutter edge 162 is in contact with the material 12.

The controller 1 estimates the life of the cutter edge 162 based on the load on the motor 5C when the cutter edge 162 is in contact with the material 12, i.e., a cutting load. A cutting load is the load applied on the motor 5C in cutting machining. The controller 1 obtains, from the servo driver 2C, a value of supply current from the servo driver 2C that is performing cutting to the motor 5C, as the cutting load. The controller 1 also estimates the life of the cutter edge 162 based on an image of the cut portion captured by the vision sensor 17.

In addition, the controller 1 displays a warning prompting the operator of machine to perform machine maintenance on the display device 19 based on a life estimation result, thereby providing the warning to the operator of machine. The controller 1 may display the remaining life of the cutter edge 162 rather than the warning, on the display device 19. Moreover, the controller 1 stores information relating to life estimation in the storage device 18. Note that a plurality of controllers may share the processes performed by the controller 1.

Figure 2:
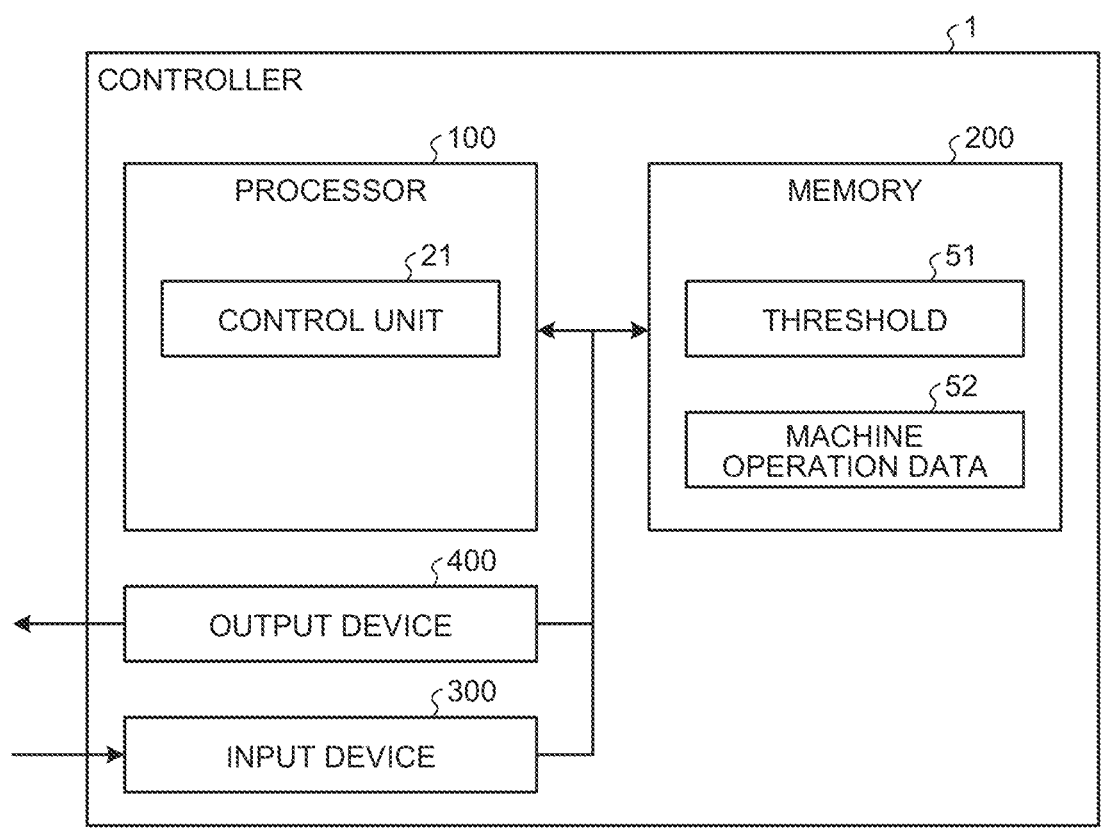
FIG. 2 is a diagram illustrating a configuration of the controller included in the machining apparatus according to the embodiment.

FIG. 2 is a diagram illustrating a configuration of the controller included in the machining apparatus according to the embodiment. The controller 1 can be implemented by an input device 300, a processor 100, a memory 200, and an output device 400. Examples of the processor 100 include a central processing unit (CPU) (also known as a processing unit, a computing unit, a microprocessor, a microcomputer, and a digital signal processor (DSP)) and a system large scale integration (LSI). Examples of the memory 200 include a random access memory (RAM) and a read-only memory (ROM).

The controller 1 is implemented by the processor 100 by reading and executing a computer-executable control program for performing an operation of the controller 1, which is stored in the memory 200. It can also be said that the control program, which is a program for performing an operation of the controller 1, causes a computer to perform a procedure or method of the controller 1.

The control program executed by the controller 1 has a modular structure including a control unit 21. The modules are loaded into the main memory, and are generated on the main memory. The control unit 21 controls the machining apparatus 10. In addition, the control unit 21 calculates positional relationship information based on the rotational positions of the motors 5A to 5C, and determines the contact state between the cutter edge 162 and the material 12 based on the positional relationship information. The control unit 21 calculates the cutting load applied when the cutter edge 162 is in contact with the material 12, and estimates the life of the cutter edge 162 based on the cutting load. In addition, the control unit 21 displays a warning prompting the operator to perform machine maintenance on the display device 19 based on the life estimation result.

The input device 300 receives the rotational positions of the motors 5A to 5C from the servo drivers 2A to 2C, and sends the rotational positions to the processor 100. The input device 300 also receives an image captured by the vision sensor 17 from the vision sensor 17, and sends the image to the processor 100.

The memory 200 is used as a temporary memory when the processor 100 performs various processing tasks. The memory 200 stores a threshold 51, machine operation data 52, and the like. The threshold 51 includes a load threshold, a quality threshold, and a cycle threshold, each described later. The load threshold, the duality threshold, and the cycle threshold are read from the storage device 18, and stored in the memory 200.

The machine operation data 52 is data obtained or calculated by the control unit 21 during cutting machining. The machine operation data 52 includes data of load such as the cutting load; a quality evaluation value, which is a result of evaluation of cutting quality; and the like. The machine operation data 52 is stored also in the storage device 18. The machine operation data 52 will be described later in detail.

The output device 400 outputs a command generated by the control unit 21 to corresponding one of the servo drivers 2A to 2C. The output device 400 also outputs the data for machine operation 52 generated by the control unit 21 to the storage device 18. This machine operation data. 52 is stored in the storage device 18. In addition, the output device 400 outputs display data generated by the control unit 21 to the display device 19. Examples of this display data include the machine operation data 52 generated by the processor 100 and the life of the cutter edge 162 estimated by the processor 100.

The control program may be stored in a computer readable storage medium in an installable or executable file format, and provided as a computer program product. Alternatively, the control program may be provided to the controller 1 via a network such as the Internet. Note that the functionality of the controller 1 may be implemented partially in a dedicated hardware element such as a dedicated circuit and partially in software or firmware.

Figure 3:
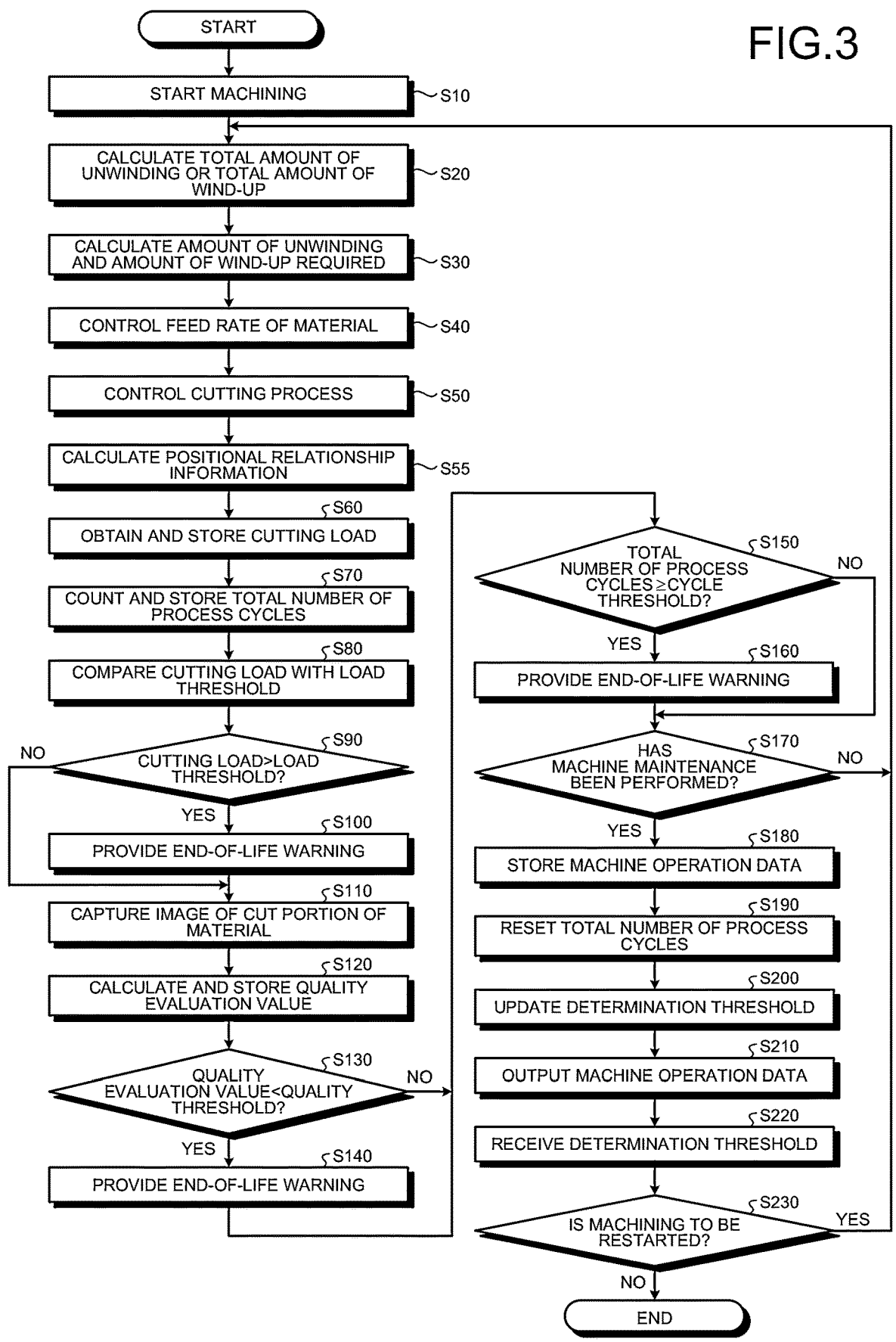
FIG. 3 is a flowchart illustrating a procedure of machining performed by the machining apparatus according to the embodiment.

FIG. 3 is a flowchart illustrating a procedure of machining performed by the machining apparatus according to the embodiment. When the machining apparatus 10 starts machining (step S10), the controller 1 outputs commands to the servo drivers 2A to 2C. The controller 1 provides commands to the servo drivers 2A to 2C to cause the unwind shaft 11A, the take-up shaft 15B, and the cutter shaft 161 to operate coordinately, using functionality such as an electronic cam for controlling synchronization among the multiple motors 5A to 5C.

The servo driver 2A supplies a drive current to the motor 5A based on a command received from the controller 1. The servo driver 2A obtains, from the encoder 6A, the rotational position of the motor 5A detected by the encoder 6A to provide control, thereby precisely controlling the motor 5A.

Similarly, the servo driver 2B supplies a drive current to the motor 5B based on a command received from the controller 1. The servo driver 2B obtains, from the encoder 6B, the rotational position of the motor 5B detected by the encoder 6B to provide feedback control, thereby precisely controlling the motor 5B.

The controller 1 controls the unwind shaft 11A and the take-up shaft 15B to operate cooperatively to cause the material 12 to be unwound, machined, and wound up at a constant rate and at a constant tension.

As the material 12 is unwound and wound up, the radius of the material 12 on the unwind shaft 11A decreases by the thickness corresponding to the length of the material 12 that has been unwound, and conversely, the radius of the material 12 on the take-up shaft 15B increases by the thickness corresponding to the length of the material 12 that has been wound up. Thus, the radius of the material 12 on the unwind shaft 11A decreases depending on the total amount of unwinding, while the radius of the material 12 on the take-up shaft 15B increases depending on the total amount of wind-up.

The controller 1 provide commands to the servo drivers 2A and 2B for adjustment of the rotational speeds of the respective motors 5A and 5B according to the total amount of unwinding and to the total amount of wind-up of the material 12 so that the material 12 is unwound and wound up always at a constant rate.

Specifically, the controller 1 calculates the total number of rotations of either the motor 5A or the motor 5B based on the history of the rotational position thereof. The controller 1 calculates the total amount of unwinding of the material 12 based on the total number of rotations of the motor 5A when calculating the total number of rotations of the motor 5A. Meanwhile, the controller 1 calculates the total amount of wind-up of the material 12 based on the total number of rotations of the motor 5B when calculating the total number of rotations of the motor 5B. That is, the controller 1 calculates the total amount of unwinding or the total amount of wind-up based on the history of the rotational position of the corresponding one of the motor 5A and the motor 5B (step S20). As described above, because the total amount of unwinding is identical to the total amount of wind-up, the controller 1 calculates either the total amount of unwinding or the total amount of wind-up.

The controller 1 calculates the amount of unwinding and the amount of wind-up required to maintain a constant unwinding speed and a constant wind-up speed of the material 12 (step S30). That is, the controller 1 calculates the radius of the material 12 on the unwind shaft 11A based on the total amount of unwinding of the material 12, and then calculates, based on this radius, the number of rotations per unit time of the unwind shaft 11A to maintain a constant amount of unwinding per unit time of the material 12.

In addition, the controller 1 calculates the radius of the material 12 on the take-up shaft 15B based on the total amount of wind-up of the material 12, and then calculates, based on this radius, the number of rotations per unit time of the take-up shaft 15B to maintain a constant amount of wind-up per unit time of the material 12.

The controller 1 controls the feed rate of the material 12 to cause the material 12 to pass through the cutting mechanism 16 at a constant rate (step S40). That is, the controller 1 controls the unwind shaft 11A and the take-up shaft 15B using the number of rotations per unit time calculated.

The amount of unwinding and the amount of wind-up per unit time of the material 12 both correspond to the passage speed of the material 12 in the cutting mechanism 16, that is, the feed speed of the material 12. The controller 1 maintains the feed rate of the material 12 at a constant value, thereby causing the material 12 to pass through the cutting mechanism 16 at a constant rate.

Note that the machining apparatus 10 may include various mechanisms such as, for example, a tension adjustment mechanism such as a dancer roller for unwinding and winding up the material 12 while maintaining a certain constant tension; and a meandering correction mechanism for winding up the material 12 on the straight.

The servo driver 2C supplies a drive current to the motor 5C based on a command received from the controller 1. In addition, the servo driver 2C obtains, from the encoder 6C, the rotational position of the motor 5C detected by the encoder 6C to provide feedback control, thereby precisely controlling the motor 5C. Thus, the motor 5C rotates the cutter shaft 161, and in turn, the cutter shaft 161 rotates the cutter edge 162.

The controller 1 controls both unwinding and winding up of the material 12 and rotation of the cutter edge 162 to control the cutting machining (step S50). In this control, the controller 1 controls the rotational speed of the cutter edge 162 to match the feed speed of the material 12 so that the cutter edge 162 is accurately pressed against the position at which the material 12 is to be cut. Thus, the controller 1 controls the cutter edge 162 to be pressed against the material 12 together with control of material feeding.

This enables the machining apparatus 10 to simultaneously perform material feeding and cutting without reducing the speed of the material feeding or stopping the material feeding, thereby achieving high productivity and eliminating the need for complicated tension control relating to stopping or increasing or reducing the speed of material feeding.

The encoder 6A detects the rotational position of the motor 5A, and sends the result to the servo driver 2A. The servo driver 2A sends the rotational position of the motor 5A to the controller 1. The encoder 6B detects the rotational position of the motor 5B, and sends the result to the servo driver 2B. The servo driver 2B sends the rotational position of the motor 5B to the controller 1. The encoder 6C detects the rotational position of the motor 5C, and sends the result to the servo driver 2C. The servo driver 2C sends the rotational position of the motor 5C to the controller 1.

The controller 1 calculates the positional relationship information based on the rotational positions of the motors 5A to 5C (step S55). The controller 1 determines whether the cutter shaft 161 is currently cutting the material 12 based on the positional relationship information.

Deterioration of the cutter edge 162 increases the cutting load on the motor 5C during cutting, and thus increases force for pressing the cutter edge 162 against the material 12, that is, the torque required for the motor 5C to drive the cutter shaft 161. Accordingly, the servo driver 2C increases the value of supply current to the motor 5C with an increase in the cutting load. The controller 1 observes the value of supply current during cutting machining from the servo driver 2C to the motor 5C to obtain the cutting lead, and stores the cutting load in the machine operation data 52 in the storage device 18, as load information (step S60). The storage device 18 stores the machine operation data 52 including the load information. Note that the storage device 18 may store a transition of the cutting load, which is the load information.

A motor current, which is the value of supply current, to the motor 5C corresponds to the driving power of the motor 5C (torque for a rotary motor). During cutting, the value of supply current to the motor 5C increases by an amount equivalent to the cutting load, compared to the value of when the cutter edge 162 rotates idly. Moreover, when the cutter edge 162 deteriorates and becomes blunt, the cutting load further increases, and thus increases the value of supply current to the motor 5C.

The controller 1 counts the total number of machining cycles, and stores the total number of machining cycles in the storage device 13 (step S70). The total number of machining cycles is the cumulative number of the machining cycles. One machining cycle corresponds to a single process of machining provided by the cutter edge 162. Note that the storage device 13 may store a transition of the total number of machining cycles.

The controller 1 compares the cutting load with a load threshold (step S80). The controller 1 determines whether the cutting load is greater than the load threshold (step S90). Thus, the controller 1 determines whether the cutter edge 162 has reached the end of its life. The load threshold is a threshold for determination of end-of-life in terms of the cutting load. The cutting load as used herein is the value of supply current to the motor 5C during cutting.

If the cutting load is greater than the load threshold. (Yes at step S90), the controller 1 determines that the cutter edge 162 has reached or is approaching the end or life, and provides an end-of-life warning indicating that the cutter edge 162 has reached or is approaching the end of its life (step S100). That is, when the value of supply current to the motor 5C has increased to exceed a predetermined load threshold, the controller 1 determines that the end of life of the cutter edge 162 has been reached, and issues a warning using the display device 19 and/or the like. Note that the warning is not limited to a warning using the display device 19, the machining apparatus 10 may also output a warning with a sound using a sound output device or a warning with light using a display lamp.

As described above, the controller 1 utilizes the fact that the cutting load increases in response to deterioration of the cutter edge 162, that is, the value of supply current to the motor 5C increases, to estimate the degree of deterioration of the cutter edge 162.

In the machining apparatus 10, the encoders 6A to 6C detect the rotational positions of the respective motors 5A to 5C, and the controller 1 calculates positional relationship information between the machining position on the material 12 and the position of the cutter edge 162 based on the rotational position of the motor 5C. In addition, in a case in which the material 12 is a series of a plurality of pieces of material transported on a belt conveyor, the controller 1 calculates positional relationship information based on the rotational positions of the respective motors 5A and 5C or the rotational positions of the respective motors 5B and 5C. This enables the controller 1 to accurately determine the contact state between the material 12 and the cutter edge 162, that is, whether the material 12 is currently being cut, and to estimate the life of the cutter edge 162 with high accuracy using only the value of supply current in cutting machining without excess or deficiency.

Note that the end-of-life determination of whether the end of life has been reached is not limited to be made in two stages. The controller 1 may use two load thresholds for life estimation to make the end-of-life determination in three stages. In this case, the controller 1 determines into which of three cases the situation falls. The three cases are case (1) the end of life has been reached, case (2) the end of life will be reached in a certain period, and case (3) the end of life has not yet been reached. Moreover, N load thresholds may be provided (where N is a natural number greater than or equal to three) to allow the controller 1 to make the end-of-life determination in (N+1) stages. The controller 1 displays, on the display device 19, a warning indicating the stage of life also in a case in which the end-of-life determination is made in three or more stages.

In addition, the controller 1 may estimate the remaining life of the cutter edge 162 based on the cutting load. In this case, the controller 1 estimates the life such that a larger cutting load results in a shorter time period in which the cutter edge 162 will be usable. The controller 1 displays the estimated life on the display device 19.

The description or the embodiment refers to each of both of the determination for the current stage of life of the cutter edge 162 and the estimation for the remaining life of the cutter edge 162, as life estimation process with respect to the cutter edge 162.

In the machining apparatus 10, the machining position on the material 12 corresponding to the rotational positions of the unwind shaft 11A and of the take-up shaft 15B, and the position of the cutter edge 162 corresponding to the position of the cutter shaft 161, are managed by the controller 1 and by the servo drivers 2A to 2C. This enables the controller 1 to readily and accurately determine whether the cutter edge 162 is currently being pressed against the material 12, that is, whether the material 12 is currently being cut. The controller 1 obtains the value of supply current during cutting from the servo driver 2C to the motor 5C without excess or deficiency, and uses an integrated value or an average value of the value of supply current obtained during a certain time period, as the cutting load, for life estimation of the cutter edge 162. This enables the controller 1 to obtain a high-accuracy life estimation result of the cutter edge 162.

The vision sensor 17 takes an image of the cut portion of the material 12 according to an instruction given by the controller 1 (step S110). Because the controller 1 controls timing or image capturing by the vision sensor 17 cooperatively with the unwind shaft 11A and the take-up shaft 15B, the vision sensor 17 can capture an accurate image of the cut portion of the material 12 even during material feeding. That is, the controller 1 servo-controls both the material feeding and the driving of the cutter edge 162, and causes to capture an image of the cut portion by the vision sensor 17 that is controlled in synchronization with the motors 5A to 5C. This enables an accurate image to be obtained that corresponds to the positional relationship information. This eliminates the need to stop, or reduce the speed of, the material 12 to capture an image during material feeding, and thus enables the machining apparatus 10 to ensure high productivity. That is, the machining apparatus 10 can feed material and capture images in parallel without loss of productivity.

Otherwise, if the cutting load is less than or equal to the load threshold (No at step S90), the controller 1 performs the operation at step 3110 without providing an end-of-life warning.

A progress of deterioration of the cutter edge 162 may generate a ragged edge or burr in the cut portion, which degrades machining quality. The controller 1 therefore obtains an image of the cut portion, which is the result of image capturing by the vision sensor 17, to evaluate cutting quality through image analysis or the like.

The controller 1 stores the result of image capturing in the storage device 18, calculates a quality evaluation value, which is a result of evaluation of cutting quality, and stores the quality evaluation value in the machine operation data 52 in the storage device 18 (step S120). The result of image capturing and the quality evaluation value stored by the controller 1 in the storage device 18 are collectively referred to as quality information. The storage device 18 stores the machine operation data 52 including the quality information. Note that the controller 1 may store only one of the result of image capturing and the quality evaluation value, in the storage device 18. In this case, either the result of image capturing or the quality evaluation value stored in the storage device 18 is the quality information. Note that the storage device 18 may store a transition in the quality evaluation value that is the quality information.

The controller 1 determines whether the quality evaluation value is less than a quality threshold. (step S130). The quality threshold is a threshold for determining end-of-life in terms of the quality evaluation value. If the quality evaluation value is less than the quality threshold (Yes at step S130), the controller 1 determines that the end of life of the cutter edge 162 has been reached or is about to be reached, and provides an end-of-life warning indicating that the cutter edge 162 has reached the end of is life (step S140).

Note that, similarly to the case for the life estimation based on an increase in the cutting load and the case for the warning due to an increase in the cutting load, the controller 1 may perform life estimation based on a decrease in the cutting quality and warning due to a decrease in the cutting quality in a plurality of stages depending on the degree of change in the cutting quality.

The controller 1 determines whether the total number of machining cycles has reached a cycle threshold (step S150). The cycle threshold is a threshold for determining end-of-life in terms of the total number of machining cycles. The cycle threshold is the least number of cycles in the past. The least number of cycles in the past is the minimum total number of machining cycles among the total numbers of machining cycles, each of which is the total number counted from the time of maintenance to the time or next maintenance performed on the machining apparatus 10. An example or maintenance described herein is replacement of the cutter edge 162.

Otherwise, if the quality evaluation value is greater than or equal to the quality threshold (No at step S130), the controller 1 performs the operation at step S150 without providing an end-of-life warning.

If the total number of machining cycles has reached the cycle threshold (Yes at step S150), the controller 1 provides an end-of-life warning indicating that the cutter edge 162 has reached the end of life (step S160).

The controller determines whether machine maintenance, which is maintenance operation of the machining apparatus 10, has been performed (step S170). Otherwise, if the total number of machining cycles has not yet reached the cycle threshold (No at step S150), the controller 1 performs the operation at step S170 without providing an end-of-life warning.

If machine maintenance has not been performed (No at step S170), the machining apparatus 10 returns to the operation at step S20, and performs the operations at steps from S20 to S170. If machine maintenance has been performed. (Yes at step S170), the controller 1 additionally records the total number of machining cycles since the last performance of machine maintenance in the storage device 18. That is, the controller 1 additionally records a new total number of machining cycles in the storage device 18 without deleting the records of the total numbers of machining cycles that have been stored in the storage device 18. This causes the storage device 13 to store the machine operation data 52 including history information having a record of the total number of machining cycles additionally recorded therein (step S180). The history information is information of history of total numbers of machining cycles.

As described above, the controller 1 sequentially stores the machine operation data 52 in the storage device 18 while providing control on the motors for material feeding and for cutting machining. That is, the controller 1 stores, in the storage device 18, the machine operation data 52 including the total number of machining cycles, the value of supply current to the motor 5C in cutting machining, the captured image data of the cut portion obtained by the vison sensor 17, and the quality evaluation value in parallel to control of motors 5A to 5C.

Note that the machine operation data 52 may be stored in the storage device 18 for each single cycle of cutting machining or once for multiple cycles of cutting machining. That is, considering that the cutter edge 162 and the like slowly deteriorate with repeated cutting, the controller 1 may store the machine operation data 52 once for multiple cycles of cutting machining depending on a demand for a reduced amount of stored information.

After performing machine maintenance, the controller 1 resets the total number of machining cycles (step, S190), and starts counting a new total number of machining cycles. The controller 1 stores the counted total number of machining cycles in the storage device 18.

The total number of machining cycles is thus started to be counted at the time when machine maintenance is performed, and is sequentially stored in the storage device 18 in addition, each time a machine maintenance work is performed, the total number of machining cycles counted from the last machine maintenance co the current machine maintenance is additionally recorded in the history information.

Note that the controller 1 may separately count the total number of machining cycles for each machine component that has undergone maintenance. In this case, the controller 1 estimates the timing to perform maintenance for the each machine component based on the total number of machining cycles of the each machine component since the maintenance performed on that machine component. For example, when the total number of machining cycles for one of those machine components reaches the cycle threshold of that machine component, the controller 1 determines that the timing to perform maintenance of that machine component is reached, and provides a warning prompting the operator of machine to perform maintenance of that machine component. This enables the controller 1 to provide a warning prompting the operator to perform machine maintenance on a machine-component on each machine-component basis, also for machine components other than the cutter edge 162 that is to undergo life estimation based on the cutting load or on the cutting quality.

In addition, the controller 1 may display a previous maintenance interval of the each machine component on the display device 19. Moreover, the controller 1 may provide a warning prompting the operator to perform machine maintenance on a machine-component on each machine-component basis when a machine component approaches its previous maintenance interval.

The controller 1 updates the load threshold, the quality threshold, and the cycle threshold based on the machine operation data 52 (step S200). The load threshold is a first threshold. The quality threshold is a second threshold. The cycle threshold is a third threshold. Note that the following description may refer to one or more of the load threshold, the quality threshold, and the cycle threshold each as a determination threshold.

The controller 1 adjusts the determination threshold(s) based on, for example, at least one of multiple evaluation metrics such as the transition of the cutting load, the transition of the quality evaluation value, the transition of the total number of machining cycles, the life estimation result for the cutter edge 162, and the machine maintenance history, each serving as the machine operation data 52.

The controller 1 may update the load threshold with, for example, a cutting load (value of supply current to the motor 5C) upon completion of as many machining cycles as the cycle threshold. The controller 1 may also update the quality threshold with a quality evaluation value upon completion of as many machining cycles as the cycle threshold. In these cases, the controller 1 uses the load threshold updated and the quality threshold updated in the subsequent life estimation.

In addition, the controller 1 may update the quality threshold with a quality evaluation value at the time when the cutting load has exceeded the load threshold. The controller 1 may also update the cycle threshold with a total number of machining cycles at the time when the cutting load has exceeded the load threshold. In these cases, the controller 1 uses the quality threshold updated and the cycle threshold updated in the subsequent life estimation.

Moreover, the controller 1 may update the load threshold with a cutting load at the time when the quality evaluation value has fallen below the quality threshold. The controller 1 may also update the cycle threshold with a total number of machining cycles at the time when the quality evaluation value has fallen below the quality threshold. In these cases, the controller 1 uses the load threshold updated and the cycle threshold updated in the subsequent life estimation.

As described above, because the controller 1 adjusts the determination threshold(s) based on a transition in the machine operation data 52, it is possible to gradually improve accuracy of life estimation. The controller 1 can adjust, based on any of evaluation indicators used for life estimation, the threshold of another evaluation indicator, thereby improving accuracy of life estimation performed using evaluation indicators.

Note that it is not limited to update all the determination thresholds. The controller 1 may update one or two out of the load threshold, the quality threshold, and the cycle threshold. Alternatively, the controller 1 may skip updating the load threshold, the quality threshold, and the cycle threshold.

The controller 1 outputs, to the display device 19, the machine operation data 52 stored in the storage device 18 in response to a request from the operator of machine (step S210). This causes the display device 19 to display the machine operation data 52. Note that the controller 1 may output the machine operation data 52 to the display device 19 when the machine operation data 52 is updated, even without a request from the operator of machine.

The controller 1 may also output the transition of the machine operation data 52 to the display device 19. In this case, the display device 19 displays the transition of the machine operation data 52. The controller 1 may display the transition of the machine operation data 52 on the display device 19 in any form including a list and a graph to visualize the transition in the machine operation data 52. This allows the operator of machine to visually check the transition of the machine operation data 52.

In addition, the machining apparatus 10 may provide the operator of machine with threshold adjustment means for manually adjusting the determination threshold(s). The threshold adjustment means provides functionality to allow the operator of machine to manually modify the determination threshold(s) while viewing the machine operation data 52 displayed on the display device 19. In a case in which the display device 19 is a touch panel, the display device 19 may receive information for adjusting the determination threshold(s). Otherwise, a button, a mouse, a keyboard, or the like provided on the machining apparatus 10 may receive information for adjusting the determination threshold(s).

Upon reception of one or more determination thresholds input by the operator of machine (step S220), the controller 1 updates the determination threshold(s) stored in the storage device 18 with the determination threshold(s) received.

Thus, the controller 1 can reflect experience and know-how of the operator of machine in life estimation; accordingly, the controller 1 can obtain a flexible life estimation result in accordance with actual machine operation and machine maintenance.

The cutting is suspended in the machining apparatus 10 during machine maintenance. Accordingly, the controller 1 determines whether to restart the machining based on operation by the operator of machine (step S230).

If the operator of machine operates the machining apparatus 10 to restart the machining (Yes at step S230), the machining apparatus 10 returns to the operation at step S20, and performs the operations at steps from S20 to S220. If the operator of machine does not operate the machining apparatus 10 to restart the cutting (No at step S230), the machining apparatus 10 terminates the machining.

Note that the set of operations at steps from S80 to S100 may be performed at any time as long as it is performed after the operation at step S60. In addition, the operation at step S60 may be performed at any time as long as it is performed after the operation at step S55 and before the operation at step S80. Moreover, the set of operations at steps from S110 to S140 may be performed at any time as long as it is performed after the operation at step S50. Furthermore, the set of operations at steps S150 and S160 may be performed at any time as long as it is performed after the operation at step S70. In addition, the operation at step S70 may be performed at any time s long as it is performed after the operation at step S50 and before the operation at step S150. Moreover, the set of operations at steps from S180 to S230 may be performed at any time as long as it is performed after machine maintenance and before the restart of the operation. Furthermore, the operation at step S190 may be performed at any time as long as it is performed after the operation at step S180. In addition, the operations at steps from S190 to S220 may be performed in any order. Moreover, the operation at step S210 may be performed during the cutting.

Note that although the embodiment has been described a case where the controller 1 performs life estimation based on the cutting load and life estimation based on the quality evaluation value, the controller 1 may perform life estimation based on both the cutting load and the quality evaluation value in this case, the controller 1 provides an end-of-life warning indicating that the tool has reached the end of life of the cutter edge 162 when the cutting load is greater than the load threshold or when the quality evaluation value is less than the quality threshold. In addition, the controller 1 may calculate the average value of the life estimated based on the cutting load and the life estimated based on the quality evaluation value, as the life of the cutter edge 162. As described above, the controller 1 can obtain the flexible life estimation result by performing life estimation based on both the cutting load and the quality evaluation value.

Alternatively, the controller 1 may perform life estimation based on the quality evaluation value without performing life estimation based on the cutting load. In this case, the machining apparatus 10 does not need to include a servo mechanism. That is, the motors 5A to 5C may each be a motor other than a servomotor, and the drivers to drive the motors 5A to 5C may be drivers other than the servo drivers 2A to 2C. Moreover, the machining apparatus 10 may not include the encoders 6A to 6C.

Thus, according to the embodiment, the controller 1 calculates positional relationship information representing the positional relationship between the machining position on the material 12 and the position of the cutter edge 162 based on the rotational position of the motor 5C. The controller 1 then determines whether the cutter edge 162 is in contact with the material 12 based on the positional relationship information, and estimates the life of the cutter edge 162 based on the load on the motor 5C when the cutter edge 162 is in contact with the material 12. This enables the machining apparatus 10 to determine an accurate contact state between the cutter edge 162 and the material 12, and thus accurately estimate the life of the cutter edge 162.

In addition, the controller 1 calculates the quality evaluation value by analyzing an image of the cut portion captured by the vision sensor 17, and then evaluates cutting quality based on the quality evaluation value. Therefore, the controller 1 can accurately estimate the life of the cutter edge 162.

The configuration described in the foregoing embodiment is merely an example. This configuration may be combined with a known other technology, and a part of the configuration may be omitted and/or modified without departing from the gist thereof.

REFERENCE SIGNS LIST 1 controller; 2A to 2C servo driver; 5A to 5C motor; 6A to 6C encoder; 10 machining apparatus; 11A unwind shaft; 12 material; 13A, 13B guide roller; 15B take-up shaft; 16 cutting mechanism; 17 vision sensor; 18 storage device; 19 display device; 21 control unit; 51 threshold; 52 machine operation data; 100 processor; 161 cutter shaft; 162 cutter edge; 200 memory; 300 input device; 400 output device.

The invention claimed is:

1. A machining apparatus comprising:
a first servomotor to drive a conveyor that conveys a material to be machined;
a second servomotor to drive a tool for cutting the material;
a first encoder to detect a first rotational position of a shaft of the first servomotor;
a second encoder to detect a second rotational position of a shaft of the second servomotor;
a processor; and
a memory to store a program which performs, when executed by the processor, processes of:
controlling the first servomotor based on the first rotational position and controlling the second servomotor based on the second rotational position, to coordinately control a conveyance of the material and a movement of the tool,
wherein the processor calculates positional relationship data indicating a positional relationship between a machining position on the material and a position of the tool based on the second rotational position, determines whether the tool is in a contact state based on the positional relationship data, and estimates a life of the tool based on a load on the second servomotor when the tool is in the contact state, the contact state being a state in which the tool is in contact with the material.

2. The machining apparatus according to claim 1, wherein:
the processor calculates the positional relationship data based on the first rotational position and on the second rotational position.

3. The machining apparatus according to claim 1, further comprising:
an imaging device to image a cut portion of the material where the material is cut by the tool to generate an image of the cut portion,
wherein the processor evaluates a cutting quality of the cut portion based on the image to calculate a quality evaluation value, the quality evaluation value being a result of evaluation of the cutting quality, and estimates the life of the tool based on the quality evaluation value and on the load.

4. The machining apparatus according to claim 3, wherein:
the processor adjusts a determination threshold based on at least one of a transition in the load, a transition in the quality evaluation value, a total number of machining cycles, a life estimation result of the tool, or a history of machine maintenance of the machining apparatus, the total number of machining cycles being a total number of machining cycles of cutting the material by the tool, the determination threshold being for use in estimation of the life of the tool to determine whether the tool reaches an end of the life of the tool.

5. The machining apparatus according to claim 4, wherein:
the determination threshold is at least one of a first threshold to be compared by the processor with the load in estimation of the life of the tool, a second threshold to be compared by the processor with the quality evaluation value in estimation of the life of the tool, and a third threshold to be compared by the processor with the total number of machining cycles in estimation of the life of the tool.

6. The machining apparatus according to claim 4, wherein:
the processor estimates a timing to perform maintenance for each one of components of the machining apparatus based on the total number of machining cycles of the each one of the components since the maintenance previously performed on the each one of the components.

7. The machining apparatus according to claim 4, further comprising:
a display to display at least one of the total number of machining cycles, the load, a result of estimation of the life, the image, the quality evaluation value, the determination threshold, or an end-of-life warning indicating that the tool reaches the end of the life of the tool.

8. A tool life estimation method comprising:
driving a conveyor that conveys a material to be machined;
driving a tool for cutting the material;
detecting a first rotational position of a shaft of a first servomotor;

detecting a second rotational position of a shaft of a second servomotor;

controlling the first servomotor based on the first rotational position and controlling the second servomotor based on the second rotational position, to coordinately control a conveyance of the material and a movement of the tool; and calculating positional relationship data indicating a positional relationship between a machining position on the material and a position of the tool based on the second rotational position, determining whether the tool is in a contact state based on the positional relationship data, and estimating a life of the tool based on a load on the second servomotor when the tool is in the contact state, the contact state being a state in which the tool is in contact with the material.

9. The tool life estimation method according to claim 8, wherein:

the calculating the positional relationship data calculates the positional relationship data based on the first rotational position and on the second rotational position.

10. The tool life estimation method according to claim 8, further comprising:

cutting a portion of the material to generate an image of the cut portion; and evaluating a cutting quality of the cut portion based on the image to calculate a quality evaluation value, the quality evaluation value being a result of evaluation of the cutting quality, and estimating the life of the tool based on the quality evaluation value and on the load.

11. The tool life estimation method according to claim 10, further comprising:

adjusting a determination threshold based on at least one of a transition in the load, a transition in the quality evaluation value, a total number of machining cycles, a life estimation result of the tool, or a history of machine maintenance, the total number of machining cycles being a total number of machining cycles of cutting the material by the tool, the determination threshold being for use in estimation of the life of the tool to determine whether the tool reaches an end of the life of the tool.

12. The tool life estimation method according to claim 11, wherein:

the determination threshold is at least one of a first threshold to be compared with the load in estimation of the life of the tool, a second threshold to be compared with the quality evaluation value in estimation of the life of the tool, and a third threshold to be compared with the total number of machining cycles in estimation of the life of the tool.

13. The tool life estimation method according to claim 11, further comprising:

estimating a timing to perform maintenance for each one of components of the machining apparatus based on the total number of machining cycles of the each one of the components since the maintenance previously performed on the each one of the components.

14. The tool life estimation method according to claim 11, further comprising:

displaying at least one of the total number of machining cycles, the load, a result of estimation of the life, the image, the quality evaluation value, the determination threshold, or an end-of-life warning indicating that the tool reaches the end of the life of the tool.

* * * * *